US009674003B2

(12) United States Patent
Kant et al.

(10) Patent No.: US 9,674,003 B2
(45) Date of Patent: Jun. 6, 2017

(54) METHODS AND NODES IN A WIRELESS COMMUNICATION NETWORK

(71) Applicant: Huawei Technologies Co., Ltd., Shenzhen (CN)

(72) Inventors: Shashi Kant, Kista (SE); Fredrik Rusek, Lund (SE); Gengshi Wu, Shanghai (CN); Basuki Endah Priyanto, Kista (SE); Sha Hu, Shanghai (CN); Jianjun Chen, Lund (SE)

(73) Assignee: Huawei Technologies Co., Ltd., Shenzhen (CN)

(*) Notice: Subject to any disclaimer, the term of this patent is extended or adjusted under 35 U.S.C. 154(b) by 250 days.

(21) Appl. No.: 14/457,877

(22) Filed: Aug. 12, 2014

(65) Prior Publication Data
US 2014/0348120 A1 Nov. 27, 2014

Related U.S. Application Data

(63) Continuation of application No. PCT/EP2013/057079, filed on Apr. 4, 2013.

(51) Int. Cl.
*H04L 25/02* (2006.01)
*H04L 25/03* (2006.01)
(Continued)

(52) U.S. Cl.
CPC ....... *H04L 25/0204* (2013.01); *H04B 7/0413* (2013.01); *H04L 1/0017* (2013.01);
(Continued)

(58) Field of Classification Search
CPC . H04L 1/18; H04L 25/03; H04L 25/02; H04L 25/06; H04L 1/0017; H04L 1/1835;
(Continued)

(56) References Cited

U.S. PATENT DOCUMENTS

| 2005/0013348 | A1* | 1/2005 | Visoz | H04B 1/712 |
| | | | | 375/148 |
| 2008/0232510 | A1* | 9/2008 | Golitschek Edler Von | |
| | | | Elbwart | H04L 27/38 |
| | | | | 375/298 |

(Continued)

FOREIGN PATENT DOCUMENTS

CN 101582864 A 11/2009

OTHER PUBLICATIONS

Peter Hammarberg, Fredrik Rusek and Ove Edfors, titled "Iterative receivers with channel estimation for multi-user MIMO-OFDM: complexity and performance," (Hammarberg) hereinafter) was published as Hammarberg et al. EURASIP Journal on Wireless Communications and Networking 2012, 2012:75; DOI: 10.1186/1687-1499-2012-75.*

(Continued)

*Primary Examiner* — Andrew Lai
*Assistant Examiner* — Hoyet H Andrews, III
(74) *Attorney, Agent, or Firm* — Conley Rose, P.C.

(57) ABSTRACT

Receiver and method in a receiver, for iterative channel estimation and data decoding of signals received from a radio network node, located in a wireless communication network. The method comprises detecting a signal of the radio network node, performing channel estimation of the detected signal, based on iterative application of a Space Alternating Generalized Expectation and maximization, SAGE, algorithm, determining a channel/link quality, based on the performed channel estimation and the estimated channel parameters, selecting Multiple-Input and Multiple-Output, MIMO, detector, based on the determined channel quality, determining to enable and/or disable, respectively, soft-Iterative Channel Estimation, soft-ICE, based on the (Continued)

determined channel quality, and iterating the performed channel estimation for a predetermined number of times.

16 Claims, 7 Drawing Sheets

(51) Int. Cl.

| | | |
|---|---|---|
| *H04L 1/18* | (2006.01) | |
| *H04L 25/06* | (2006.01) | |
| *H04B 7/04* | (2006.01) | |
| *H04L 1/00* | (2006.01) | |
| *H04W 72/08* | (2009.01) | |
| *H04B 7/0413* | (2017.01) | |

(52) U.S. Cl.
CPC .......... *H04L 1/1835* (2013.01); *H04L 25/025* (2013.01); *H04L 25/0256* (2013.01); *H04L 25/03898* (2013.01); *H04L 25/03949* (2013.01); *H04L 25/067* (2013.01); *H04W 72/085* (2013.01)

(58) Field of Classification Search
CPC ............... H04L 25/0204; H04L 25/025; H04L 25/0256; H04L 25/03898; H04L 25/03949; H04L 25/067; H04B 7/0413; H04W 72/085
See application file for complete search history.

(56) References Cited

U.S. PATENT DOCUMENTS

| | | | |
|---|---|---|---|
| 2011/0051860 A1 | 3/2011 | Tang et al. | |
| 2013/0343215 A1* | 12/2013 | Li | H04B 7/024 370/252 |

OTHER PUBLICATIONS

Monica Nicoli, Member, IEEE, Simone Ferrara, Student Member, IEEE, and Umberto Spagnolini, Senior Member, IEEE, titled "Soft-Iterative Channel Estimation: Methods and Performance Analysis," (Nicoli) hereinafter) was published as Nicoli et al. IEEE Transactions on Signal Processing, Vol. 55, No. 6, Jun. 2007 Published: Jun. 2007.*
"3rd Generation Partnership Project; Technical Specification Group Radio Access Network; Evolved Universal Terrestrial Radio Access (E-UTRA); User Equipment (UE) radio access capabilities (Release 11)," 3GPP TS 36.306, V11.2.0, Technical Specification, Dec. 2012, 26 pages.
Hammarberg, P., et al., "Iterative receivers with channel estimation for multi-user MIMO-OFDM: complexity and performance," Journal on Wireless Communications and Networking, http://jwcn.eurasipjournals.com/content/2012/1/75, 2012, 17 pages.
Zhang, D., et al., "Iterative Channel Estimation Control for MIMO-OFDM Systems," 44th Annual Conference on Information Sciences and Systems, Mar. 17-19, 2010, 6 pages.
Gao, J., et al., "Low-Complexity MAP Channel Estimation fo Mobile MIMO-OFDM Systems," IEEE Transactions on Wireless Communications, vol. 7, No. 3, Mar. 2008, pp. 774-780.
Lee, Y., "Impact of Soft Channel Construction on Iterative Channel Estimation and Data Decoding for Multicarrier Systems," IEEE Transactions on Wireless Communications, vol. 7, No. 7, Jul. 2008, pp. 2762-2770.
Auer, F., et al., "Threshold Controlled Iterative Channel Estimation for Coded OFDM," IEEE 65th Vehicular Technology Conference, Apr. 22-25, 2007, pp. 1737-1741.
Akhtman, J., et al., "Iterative Receiver Architectures for MIMO-OFDM," IEEE Wireless Communications and Networking Conference, Mar. 11-15, 2007, pp. 826-830.

Zhang, D., "Searching for Optimal Scheduling of MIMO Doubly Iterative Receivers: An Ant Colony Optimization-Based Method," IEEE Global Communications Conference, Dec. 3-7, 2012, pp. 4658-4664.
Ylioinas, J., et al., "Scheduling of the Activations in Iterative Detection, Decoding, and Channel Estimation for MIMO-OFDM," IEEE Transactions on Communications, vol. 61, No. 2, Feb. 2013, pp. 638-647.
Kant, S., et al., "Fast Link Adaptation for IEEE 802.11n," Institute of Electronic Systems, Signal and Information Processing in Communications, Project Period Feb. 5-Aug. 6, 142 pages.
Jensen, T., et al., "Fast Link Adaptation for MIMO OFDM," IEEE Transactions on Vehicular Technology, vol. 59, No. 8, Oct. 2010, pp. 3766-3778.
Bishop, C., "Pattern Recognition and Machine Learning," Information Science and Statistics, Oct. 1, 2007, 703 pages.
Studer, C., et al., "Asic Implementation of Soft-Input Soft-Output MIMO Detection Using MMSE Parallel Interference Cancellation," IEEE Journal of Solid-State Circuits, vol. 46, No. 7, Jul. 2011, pp. 1754-1765.
Jong, Y., et al., "Iterative Tree Search Detection for MIMO Wireless Systems," IEEE Transactions on Communications, vol. 53, No. 6, Jun. 2005, pp. 930-935.
"IEEE 802.16m Evaluation Methodology Document (EMD)," IEEE 802.16m-08/004r5, Jan. 15, 2009, 199 pages.
Sayed, A., "Adaptive Filters," Apr. 14, 2008, 28 pages.
Sesia, S., et al., "LTE—The UMTS Long Term Evolution From Theory to Practice," Second Edition, Aug. 29, 2011, 794 pages.
"3rd Generation Partnership Project; Technical Specification Group Radio Access Network; Evolved Universal Terrestrial Radio Access (E-UTRA); Physical Channel and Modulation (Release 11)," 3GPP TS 36.211, V11.1.0, Technical Specification, Dec. 2012, 108 pages.
Park, S., et al., "Iterative Receiver for Joint Detection and Channel Estimation in OFDM Systems Under Mobile Radio Channels," IEEE Transactions on Vehicular Technology, vol. 53, No. 2, Mar. 2004, pp. 450-460.
Liu, J., et al., "Efficient Computation of Symbol Statistics from Bit a Priori Information in Turbo Receivers," IEEE Transactions on Communications, vol. 57, No. 7, Jul. 2009, pp. 1889-1891.
Pricope, B., et al., "Experimental validation of a new pedestrian speed estimator for OFDM systems in indoor environments," IEEE Global Telecommunications Conference, Dec. 5-9, 2011, 5 pages.
Zhao, X., et al., "Doppler Spread Estimation by Tracking the Delay-Subspace for OFDM Systems in Doubly Selective Fading Channels," IEEE Signal Processing Letters, vol. 16, No. 3, Mar. 2009, pp. 212-215.
Choi, J., et al., "Low-Complexity Mean Delay Estimation for OFDM Systems," IEEE Transactions on Vehicular Technology, vol. 58, No. 7, Sep. 2009, pp. 3790-3795.
Mostofi, Y., et al., "ICI Mitigation for Pilot-Aided OFDM Mobile Systems," IEEE Transactions on Wireless Communications, vol. 4, No. 2, Mar. 2005, pp. 765-774.
Lu, S., et al., "Coherent and Differential Ici Cancellation for Mobile OFDM with Application to DVB-H," IEEE Transactions on Wireless Communications, vol. 7, No. 11, Nov. 2008, pp. 4110-4116.
Al-Naffouri, T., et al., "A Model Reduction Approach for OFDM Channel Estimation Under High Mobility Conditions," IEEE Transactions on Signal Processing, vol. 58, No. 4, Apr. 2010, pp. 2181-2193.
Simko, M., et al., "Inter-Carrier Interface Estimation in MIMO OFDM Systems with Arbitrary Pilot Structure," 2011, 5 pages.
Foreign Communication From A Counterpart Application, PCT Application No. PCT/EP2013/057079, International Search Report dated Feb. 13, 2014, 3 pages.
Foreign Communication From a Counterpart Application, PCT Application No. PCT/EP2013/057079, Written Opinion dated Feb. 13, 2014, 5 pages.
Lu, X., et al., "Joint Channel Estimation and Detection Algorithm for MIMO-OFDM Systems," Jan. 15, 2011, 65 pages.
English Translation of Lu, X., et al., "Joint Channel Estimation and Detection Algorithm for MIMO-OFDM Systems," Jan. 15, 2011, 8 pages.

(56) References Cited

OTHER PUBLICATIONS

Tao-Fu, M., "Research on Key Technologies of Iterative Anti-jamming in Wireless Communications," 2012, 140 pages.
Foreign Communication From A Counterpart Application, Chinese Application No. 201380006756.0, Chinese Office Action dated Dec. 9, 2016, 9 pages.

* cited by examiner

METHODS AND NODES IN A WIRELESS COMMUNICATION NETWORK

CROSS-REFERENCE TO RELATED APPLICATIONS

This application is a continuation of International Application No. PCT/EP2013/057079, filed on Apr. 4, 2013, which is hereby incorporated by reference in its entirety.

FIELD OF INVENTION

Implementations described herein relate generally to a receiver and a method in a receiver. In particular is herein described a mechanism for adaptive joint iterative channel estimation and decoding in a wireless communication network.

BACKGROUND OF INVENTION

A receiver, also known as User Equipment (UE), mobile station, wireless terminal and/or mobile terminal is enabled to communicate wirelessly in a wireless communication network, sometimes also referred to as a cellular radio system. The communication may be made, e.g., between two receivers, between a receiver and a wire connected telephone and/or between a receiver and a server via a Radio Access Network (RAN) and possibly one or more core networks.

The wireless communication may comprise various communication services such as voice, messaging, packet data, video, broadcast, etc.

The receivers may further be referred to as mobile telephones, cellular telephones, computer tablets or laptops with wireless capability. The receivers in the present context may be, for example, portable, pocket-storable, hand-held, computer-comprised, or vehicle-mounted mobile devices, enabled to communicate voice and/or data, via the radio access network, with another entity, such as another receiver or a server.

The wireless communication network covers a geographical area which is divided into cell areas, with each cell area being served by a radio network node, or base station, e.g., a Radio Base Station (RBS), which in some networks may be referred to as transmitter, eNodeB (eNB), NodeB, or B node, depending on the technology and terminology used. The network nodes may be of different classes, e.g., macro eNodeB, home eNodeB or pico base station, based on transmission power and thereby also cell size.

Sometimes, the expression "cell" may be used for denoting the radio network node itself. However, the cell may also in normal terminology be used for the geographical area where radio coverage is provided by the radio network node/base station at a base station site. One radio network node, situated on the base station site, may serve one or several cells. The radio network nodes communicate over the air interface operating on radio frequencies with the receivers within range of the respective radio network node.

In some radio access networks, several radio network nodes may be connected, e.g., by landlines or microwave, to a Radio Network Controller (RNC), e.g., in Universal Mobile Telecommunications System (UMTS). The RNC, also sometimes termed Base Station Controller (BSC), e.g., in Global System for Mobile Communications (GSM), may supervise and coordinate various activities of the plural radio network nodes connected thereto.

In 3rd Generation Partnership Project (3GPP) Long Term Evolution (LTE), radio network nodes, which may be referred to as eNodeBs or eNBs, may be connected to a gateway, e.g., a radio access gateway, to one or more core networks.

In the present context, the expressions downlink, downstream link or forward link may be used for the transmission path from the radio network node to the receiver. The expression uplink, upstream link or reverse link may be used for the transmission path in the opposite direction, i.e., from the receiver to the radio network node.

Systems beyond 3G mobile communication, e.g., 3GPP LTE, offer high data rate in the downlink by employing Multiple-Input and Multiple-Output (MIMO) with Orthogonal Frequency Division Multiplexing (OFDM) access scheme at the UE receiver. LTE, e.g., UE category 5, downlink can support up to 300 Megabits per second (Mbps) data rate, and in LTE-Advanced, e.g., UE category 8, can support data rates up to 3 Gigabits per second (Gbps).

A receiver, before being able to receive downlink data from a serving radio network node, has to perform channel estimation. The channel estimation is based on a reference signal emitted by the radio network node. A number of reference signals have been defined in the LTE downlink, e.g., Cell-specific Reference Signal (CRS). CRS is transmitted in all subframes and in all resource blocks of the carrier.

The quality of the channel estimates is utterly important to support very high data rates, in particular in highly frequency- and time-selective channel (or doubly-selective channel) conditions. Cell-specific Reference Signals aided Channel Estimation (CRS-CE) unfortunately renders error floors for high data rate scenarios in severe channel conditions, e.g., Extended Typical Urban 300 (ETU300), even though advanced (iterative) MIMO detectors are employed.

Joint Channel Estimation and Data Decoding (JCED) technique is considered as one of the potential candidates to meet high data rates in doubly-selective channel conditions. Unfortunately, JCED is very complex. Therefore, we choose an iterative approach to implement it with lower complexity. Here we name this iterative approach as Joint Iterative Channel Estimation and Data Decoding (JoICED).

Within JoICED framework, the messages are exchanged among mainly three receiver components, namely, channel estimator, data detector and channel decoder. Though JoICED is considered with a tractable complexity, the implementation complexity is evidently very high due to huge matrix inversion online. Further, non-adaptive JoICED performs very poorly when the soft-data feedback quality is low, such as when the estimated Mutual Information (MI) between the transmitted bits and the soft-data feedback is low.

There are numerous approaches for the soft-Iterative Channel Estiamtion (ICE) which exist in the literature, but the current state-of-the-art may be broadly classified into two approaches.

The first approach comprises Joint Linear Minimum Mean Square Error (joint-LMMSE), also known as Maximum A-Posteriori (MAP) based soft-ICE. This approach may be optimal in the LMMSE sense; based on the assumption that the feedback soft-data is ideal. However, the complexity is formidable and realistically infeasible to implement on the real target for an UE receiver with limited capacity, due to online matrix inversion of considerable size.

The second approach is based on, e.g., Expectation and Maximization (EM), Space Alternating Generalized Expectation and maximization (SAGE) framework based soft- ICE, Variational Bayesian based soft-ICE, etc. The EM/SAGE framework based soft-ICE is having relatively lower complexity compared to the joint-LMMSE. However, most of these methods are not really designed for inherent hybrid automatic repeat request (HARQ) based LTE systems.

As mentioned previously, the joint-LMMSE based approach is optimal in the LMMSE sense but infeasible for the UE receiver implementation due to online matrix inversion of significant size, which may involve too capacity-intense calculations for the limited capability of the UE receiver.

Furthermore, the afore-referenced methods render very poor performance when the quality of the feedback soft-data (e.g., in an MI sense which is measured between the transmitted bits and the corresponding soft bits at the receiver side) is very low and thereby have serious detrimental repercussions. Moreover, the EM/SAGE-MAP framework with low-rank approximation described in the above mentioned prior-art literature is evidently not suitable for higher order modulation when the quality of the feedback soft-data is poor.

There has been suggested some techniques in the prior-art literature for soft-ICE to cope with the low-quality of the feedback soft-data. Unfortunately, these methods are not that straightforward for LTE, MIMO-OFDM based systems, which inherently have HARQ. On the other hand, one of the methods, so-called least-squares, has been proposed to cope with the low-quality of the feedback soft-data. Although this method may be employed in UE receivers, unfortunately, it does not perform very well.

Further, most importantly, scheduling, comprising enabling and/or disabling soft-ICE within JoICED framework is utterly important depending on the channel conditions in order to minimize the Bit-Error-Rate (BER), or equivalently Block-Error-Rate (BLER). Creation of a scheduling codebook has been proposed for doubly iterative receiver (i.e., only soft MIMO detector and channel decoder without soft-ICE) based on ant colony optimisation method.

Further, an Extrinsic Information Transfer chart (EXIT) function based activation scheduling has been proposed via a trellis search and thereby creating a codebook. However, EXIT function based activation scheduling has been shown to be inaccurate.

Hence, unfortunately, these known prior-art methods are very cumbersome to employ in a real UE receiver and not straightforward for implementation in a HARQ based system, since scheduling strongly depends on the channel conditions and thus may render poor performance under unfavourable signal propagation conditions.

SUMMARY OF INVENTION

It is therefore an object to obviate at least some of the above mentioned disadvantages and to improve the performance in a wireless communication network.

According to a first aspect, the object is achieved by a method in a receiver, for iterative channel estimation and data decoding of signals received from a radio network node, located in a wireless communication network. The method comprises detecting a signal of the radio network node. Further, the method comprises performing channel estimation of the detected signal, based on iterative application of a SAGE algorithm. Also, the method in addition comprises determining a channel/link quality, based on the performed channel estimation and the estimated channel parameters. Furthermore, the method additionally comprises selecting MIMO detector, based on the determined channel quality. The method, also, in addition comprises determining to enable and/or disable, respectively, soft-ICE based on the determined channel quality. Also, in further addition, the method comprises iterating the performed channel estimation for a predetermined number of times.

According to a second aspect, the object is achieved by a receiver, configured for iterative channel estimation and data decoding of signals received from a radio network node, located in a wireless communication network. The receiver comprises a receiving circuit, configured for receiving signals from the radio network node. Further, the receiver also comprises a processing circuit, configured for detecting signals of the radio network node. The processing circuit is also configured for performing channel estimation of the detected signal, based on iterative application of a SAGE algorithm. Also, in addition, the processing circuit is furthermore configured for determining a channel/link quality, based on the performed channel estimation. Additionally, the processing circuit is also configured for selecting MIMO detector, based on the determined channel/link quality. In addition, the processing circuit located in the receiver is also configured for determining to enable and/or disable, respectively, soft-ICE based on the determined channel/link quality. The processing circuit is also further configured for iterating the performed channel estimation for a predetermined number of times.

The adaptive JoICED framework with ultra low complexity version of time/shiftvariant soft-ICE adapts the channel estimator and soft MIMO detector with the channel conditions and maximizes throughput. Further, the method for adaptive low-complexity joint iterative channel estimation and decoding as defined by the appended claims may be easily employed in any MIMO-OFDM based UE receiver; unlike the prior art methods for soft-ICE. Within the adaptive JoICED framework, some embodiments may utilise link-quality-metrics, namely (1) a cognitive scheduler and (2) a pre-Turbo decoder (TDEC) Adaptive HARQ Buffer Controller (pre-AHBC). (1) The cognitive scheduler selects an appropriate soft MIMO detector based on the channel state and the received Modulation and Coding Scheme (MCS) of the transport block. Moreover, the scheduler may enable or disable the soft-ICE depending on the channel conditions. (2) Pre-AHBC combats the error propagation induced by JoICED when the quality of the soft feedback data is low. Further, the two herein described link-quality-metrics may be utilised for the pre-AHBC operation according to some embodiments.

Thereby the result of the method may be independent from, or at least not particularly sensitive to channel conditions and/or soft-data feedback.

Moreover, by using the SAGE algorithm, as may be the case according to some embodiments, a faster convergence compared to known iterative approaches based on EM algorithm is achieved.

Further, according to some embodiments, the throughput performance within the wireless communication system is further improved by increased signal processing technique.

Thereby an improved performance within the wireless communication network is provided.

Other objects, advantages and novel features of the embodiments of the invention will become apparent from the following detailed description.

BRIEF DESCRIPTION OF THE DRAWINGS

Embodiments of the invention are described in more detail with reference to attached drawings illustrating examples of embodiments in which.

DETAILED DESCRIPTION OF INVENTION

Embodiments of the invention described herein are defined as a receiver and a method in a receiver, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
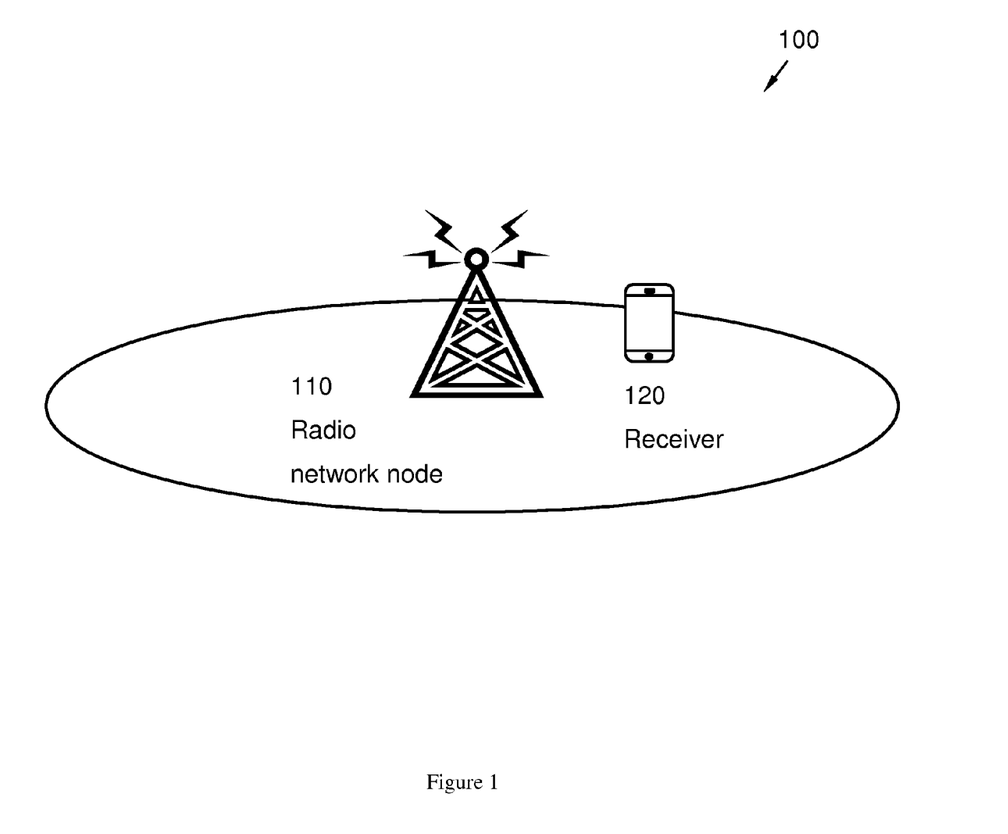
FIG. 1 is a block diagram illustrating a wireless communication network according to some embodiments.

FIG. 1 is a schematic illustration over a wireless communication network 100 comprising a serving radio network node 110 and a receiver 120. The wireless communication network 100 may at least partly be based on radio access technologies such as, 3GPP LTE, LTE-Advanced, Evolved Universal Terrestrial Radio Access Network (E-UTRAN), UMTS, GSM/Enhanced Data rate for GSM Evolution (GSM/EDGE), Wideband Code Division Multiple Access (WCDMA), Time Division Multiple Access (TDMA) networks, Frequency Division Multiple Access (FDMA) networks, Orthogonal FDMA (OFDMA) networks, Single-Carrier FDMA (SC-FDMA) networks, Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies, e.g., CDMA2000 1×RTT and High Rate Packet Data (HRPD), just to mention a few options. The expressions "wireless communication network" and "wireless communication system" may within the technological context of this disclosure sometimes be utilised interchangeably.

The wireless communication network 100 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a Guard Period (GP) situated in the time domain between the uplink and downlink signalling. FDD means that the transmitter and receiver operate at different carrier frequencies, as have previously been discussed.

The purpose of the illustration in FIG. 1 is to provide a simplified, general overview of the wireless communication network 100 and the involved methods and nodes, such as the serving radio network node 110 and receiver 120 herein described, and the functionalities involved. The method, radio network node 110 and receiver 120 will subsequently, as a non-limiting example, be described in a 3GPP LTE/LTE-Advanced environment, but the embodiments of the disclosed methods, radio network node 110 and receiver 120 may operate in a wireless communication network 100 based on another access technology such as any of the above already enumerated. Thus, although the embodiments of the invention are described based on, and using the lingo of, 3GPP LTE systems, it is by no means limited to 3GPP LTE.

The illustrated wireless communication network 100 comprises the serving radio network node 110, which is serving the receiver 120.

The serving radio network node 110 controls the radio resource management within the served cell, e.g., allocating radio resources to the receiver 120 within the cell and ensuring reliable wireless communication between the serving radio network node 110 and the receiver 120. The radio network node 110 may typically comprise an eNodeB, e.g., in an LTE-related wireless communication network 100. However, this set-up is merely an illustrating example.

A radio network node 110 such as an eNodeB may provide communication coverage for a macro cell, a pico cell, a femto cell, and/or other types of cells. A macro cell generally covers a relatively large geographic area, e.g., several kilometers in radius and may allow unrestricted access by receivers 120 with service subscriptions with the network provider. A pico cell may generally cover a relatively smaller geographic area and may allow unrestricted access by receivers 120 with service subscriptions with the network provider. A femto cell may also generally cover a relatively small geographic area, e.g., a home and, in addition to unrestricted access, may also provide restricted access by receivers 120 having an association with the femto cell such as receivers 120 located in a Closed Subscriber Group (CSG), receivers 120 of users in the home, and the like. A network node for a macro cell may be referred to as a macro network node or a macro eNodeB. A network node for a pico cell may be referred to as a pico network node, or pico eNodeB. In addition, a network node for a femto cell may be referred to as a femto network node, a femto eNodeB, a home network node or a home eNodeB, according to some terminology.

The receiver 120 is configured to receive radio signals comprising information transmitted by the serving radio network node 110 in the downlink. Correspondingly, the receiver 120 is configured to transmit radio signals comprising information to be received by the serving radio network node 110.

It is to be noted that the illustrated network setting of one radio network node 110 and one receiver 120 in FIG. 1 is to be regarded as a non-limiting example of an embodiment only. The wireless communication network 100 may comprise any other number and/or combination of radio network nodes 110 and/or receivers 120. A plurality of receivers 120 and another configuration of radio network nodes 110 may thus be involved in some embodiments of the disclosed invention.

Thus whenever "one" or "a/an" receiver 120 and/or radio network node 110 is referred to in the present context, a plurality of receivers 120 and/or radio network nodes 110 may be involved, according to some embodiments.

The serving radio network node 110 may according to some embodiments be referred to, respectively, as a base station, NodeB, evolved Node Bs (eNB, or eNode B), base transceiver station, Access Point Base Station, base station router, Radio Base Station (RBS), micro base station, pico base station, femto base station, Home eNodeB, sensor, beacon device, relay node, repeater or any other network node configured for communication with the receiver 120 over a wireless interface, depending of the radio access technology and terminology used.

The receiver 120 may be represented by, e.g., a UE, a wireless communication terminal, a mobile cellular phone, a Personal Digital Assistant (PDA), a wireless platform, a mobile station, a tablet computer, a portable communication device, a laptop, a computer, a wireless terminal acting as a relay, a relay node, a mobile relay, a Customer Premises Equipment, a Fixed Wireless Access (FWA) node or any other kind of device configured to communicate wirelessly with the serving radio network node 110, according to different embodiments and different vocabulary.

According to some embodiments, a method for adaptive JoICED, configured for being utilised in a MIMO-OFDM environment, in the wireless communication network 100, which may be based on 3GPP LTE/LTE-Advanced, may be performed. The method may cater the high data rates in doubly-selective channel conditions with scalable implementation complexity of the soft-ICE.

Moreover, embodiments of the herein described JoICED technique may schedule appropriate channel estimators and soft MIMO detectors, e.g., Soft LMMSE based Parallel Interference Cancellation (SPIC), soft QR Decomposition based M-algorithm (QRD-M), according to the channel conditions, and MCS and transmission scheme in order to maximize, or at least increase, average throughput.

Some embodiments comprise a scalable implementation complexity of soft-ICE via a low-rank SAGE-MAP framework. For the soft-ICE filtering, so-called two-dimensional (2D) jumping window may be used in some embodiments, in order to reduce the complexity by limiting the number of filtering operations for a given cell bandwidth. Further, only an ultra small size of the matrix dependent on the rank needs to be inverted per 2D filtering window size (e.g., for rank=12, only 12×12 matrix size inversion per filtering window size of 5 Physical Resource Block (PRB)-pair instead of 840×840 matrix size inversion in case of non low-rank EM/SAGE MAP or joint-LMMSE). The rank may be dependent on the size of the considered (a priori known) 2D jumping-window, estimated delay-spread and Doppler-spread. Further, the presented low-rank SAGE-MAP based soft-ICE is numerically stable for higher order modulation alphabets.

The adaptive nature of the method for JoICED as presented herein has profound benefits over the prior art solutions.

Firstly, appropriate scheduling of soft-ICE in conjunction with a suitable soft MIMO detector over JoICED iterations renders significant throughput performance gain, particularly in doubly-selective channel conditions. A novel heuristic avenue is considered for the adaptive scheduling of soft-ICE with a suitable selection of a soft MIMO detector depending on the channel conditions and MCS/channel quality indicator (CQI) index. The presented technique may in some embodiments easily be employed in a receiver 120 which utilises a so-called Link Quality Metric (LQM), denoted as LQM-S herein for the scheduling purpose. The LQM-S may be based on effective Mutual Information (MI)/Signal-To-Noise Ratio (SNR) computation (i.e., according to some embodiments, by employing, e.g., so-called Mutual Information Effective SNR Mapping (MIESM), Mean Mutual Information per Bit Mapping (MMIBM). Furthermore, the scheduler herein may enable or disable soft-ICE by utilising the LQM-S and Channel Parameter Estimates (CPE) accordingly.

Furthermore, a pre-TDEC adaptive HARQ buffer controller (pre-AHBC) is presented herein, which may store the appropriate soft bits (or alternatively LLRs) over JoICED iterations based on the LQM denoted as LQM-H for HARQ buffer controlling purpose, in order to combat the detrimental effects of generic/non-adaptive JoICED to HARQ buffer; particularly when softICE is enabled and low quality soft feedback data is utilised.

In addition, either of the two LQM-H metrics may be utilised by pre-AHBC according to different embodiments are presented.

The adaptive JoICED presented herein outperforms a non-adaptive JoICED, and may remove/reduce the error-floor for higher order modulation alphabet that persists in pilots-aided channel estimation (particularly if time-first 2×1D channel estimation technique is employed in the receiver), noticeably in highly frequency- and time-selective channel conditions.

Figure 2:
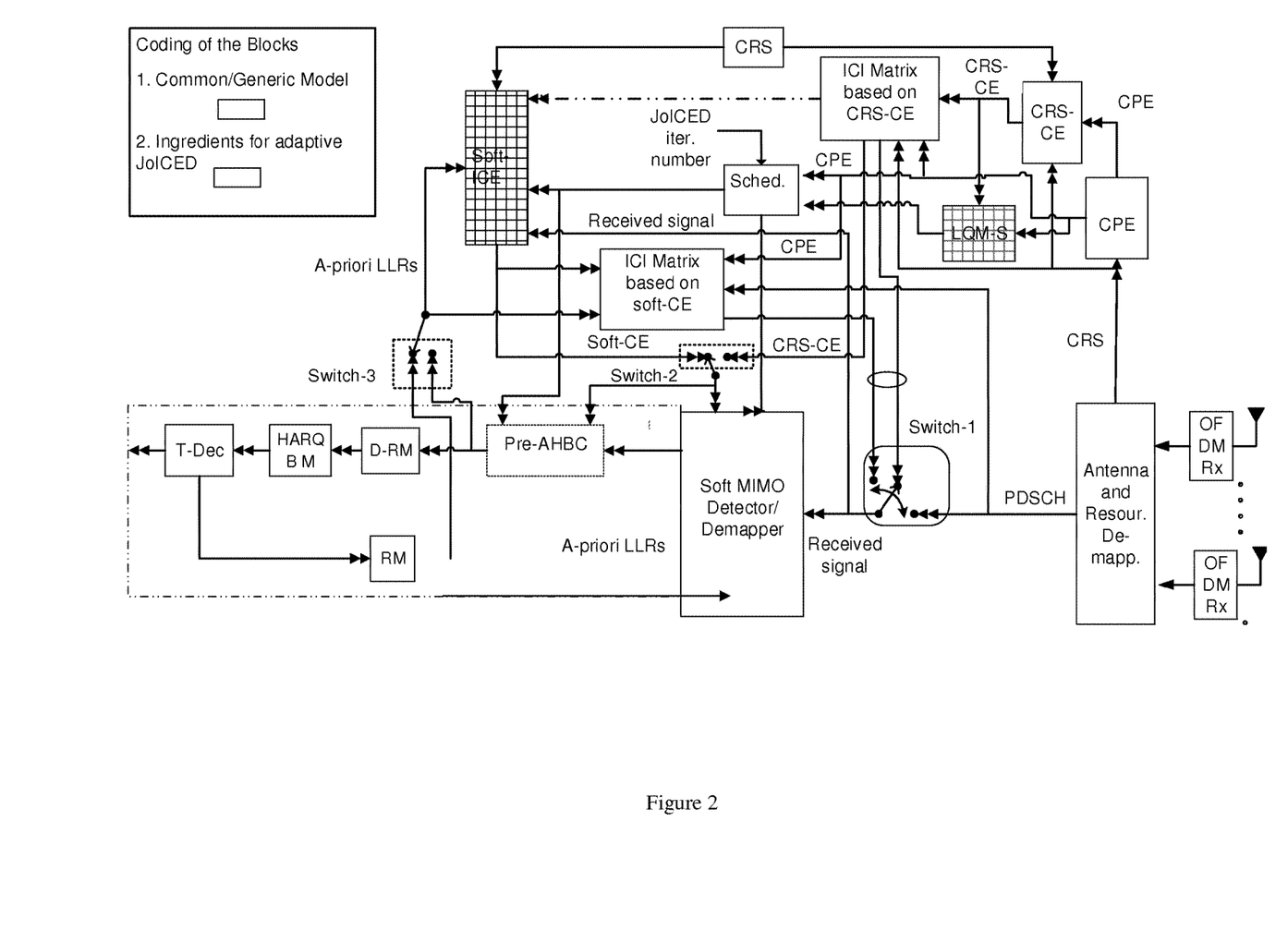
FIG. 2 is a block diagram illustrating an embodiment of a receiver architecture according to an embodiment.

FIG. 2 illustrates an LTE UE receiver block diagram for the Physical Downlink Shared Channel (PDSCH) processing with soft-ICE in conjunction with the soft MIMO detector, i.e., JoICED framework. In general, within the JoICED framework, any soft MIMO detectors/demappers, e.g., non-iterative LMMSE, Turbo soft-parallel interference canceler (PIC), Turbo QRD-M, may be employed in different embodiments.

Within the adaptive JoICED framework, a suitable channel estimator, i.e., either CRS-CE (any pilots-based technique may be employed) or soft-ICE in conjunction with a suitable soft MIMO detector may be scheduled depending on the estimated LQM-S, e.g., MIESM/MMIBM, and channel parameters, such as Doppler spread, delay spread and spatial correlation estimate, CPE. Furthermore, when soft-ICE is activated by a scheduler however, the quality of soft data feedback may be poor. In such case, the pre-AHBC may store the appropriate soft bits (or LLRs) output from the soft MIMO detector over JoICED iterations based on the LQM-H.

Moreover, according to embodiments of the presented adaptive JoICED framework based on CPE, Inter-Carrier Interference (ICI) mitigation and/or cancellation may also be employed in conjunction with the other iterative components, namely soft-ICE and soft-MIMO detector. The two embodiments of the method for estimating ICI matrix and thereby perform mitigation or cancellation is given below for the completeness of the adaptive JoICED framework:

According to the first embodiment, the time-domain channel coefficients' temporal variations may be approximated via a linear interpolation, or Taylor series, by employing hybrid frequency/time-domain channel estimation. Furthermore, higher order interpolations may also be performed via so-called Polynomial Basis Expansion Method (P-BEM). Linear Interpolation may be viewed as a special case of P-BEM with first order.

Further, according to the second embodiment, a canonical structure of the so-called full channel frequency response matrix i.e., comprising not only diagonal elements but also the off-diagonal elements within an OFDM symbol, may be used, which is quite elegantly represented in terms of the eigen vectors of the temporal correlation (i.e., intra OFDM symbol correlation).

Figure 3:
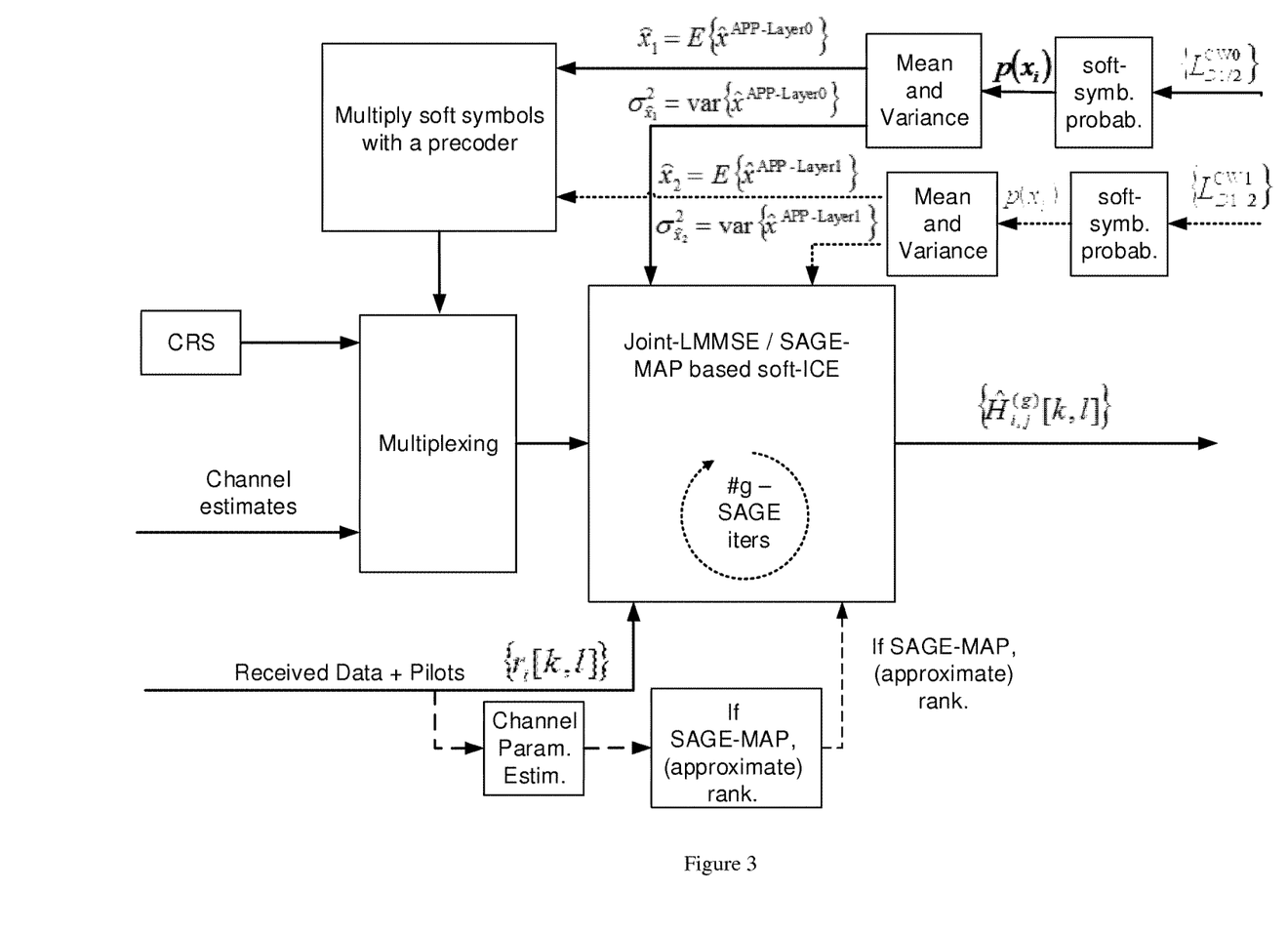
FIG. 3 is a block diagram illustrating a soft-ICE according to an embodiment of the invention.

FIG. 3 depicts a detailed structure of a soft-ICE which utilises a posteriori LLRs output from either TDEC or soft MIMO detector depending on the utilised LQM-H, in particular MI based.

The basic principle of soft-ICE comprises to re-estimate the channel in case one of the codewords is failing or both codewords are failing. In order to re-estimate the channel, softdata (or partially known data) may be utilised as virtual pilots. Furthermore, as mentioned previously, the quality of soft channel estimates is quite dependent on (or directly proportional to) the quality of the soft-data or a posteriori (APP) LLRs. In other words, when the quality of the soft data (APP-LLRs) feedback is quite poor, then the quality of the soft channel estimates may render improved and satisfying results in case an embodiment comprising pre-AHBC is employed in the receiver 120; as will be further illustrated and discussed in conjunction with the presentation of FIG. 5.

Furthermore, a post-fast Fourier transform (FFT) received signal model per receive antenna and per given Resource Element (RE) or subcarrier reads:

$$r_i[k,l] = \sum_{j=1}^{N_T} H_{i,j}[k,l] \underbrace{\sum_{s=1}^{N_S} P_{j,s}[k,l] \bar{x}_s[k,l]}_{P_{j,1:N_S} x = x_j[k,l]} + n_i[k,l] \quad \text{Eqn. 1}$$

$$= \sum_{j=1}^{N_T} H_{i,j}[k,l] x_j[k,l] + n_i[k,l]$$

where k corresponds to a subcarrier and l corresponds to an OFDM symbol within a subframe. Further, $r_i[k,l] \in \mathbb{C}$ corresponds to a received data (post-FFT) at i-th antenna port and at [k,l]-th RE position. $N_T$ corresponds to a number of CRS carrying transmit antenna ports. $N_S$ corresponds to a number of layers/spatial streams. In addition, $P_{j,s}[k,l]$ corresponds to an (j,s)-th element of (a known cell-specific) precoder matrix $P[k,l] \in \mathbb{C}^{N_T \times N_S}$ of an [k,l]-th RE. $P_{j,1:N_S}[k,l] \in \mathbb{C}^{1 \times N_S}$ corresponds to a j-th row of a precoder matrix $P[k,l]$.

In case the position in the precoder matrix is a CRS position, then the precoder elements may appropriately be considered to be either 1 or 0 according to the CRS RE mapping.

On the other hand, in case of UE-specific scenario, the precoder may be unknown at the receiver 120; hence, in that case Wiener filtering across the resource block is not possible and filtering only within a PRB pair may be utilised according to some embodiments. Further, $\bar{x}[k,l] \in \mathbb{C}^{N_S \times 1}$ corresponds to a transmitted data symbol column vector having a respective complex symbol $\bar{x}_s[k,l] \in \mathbb{C}$ at the S-th layer. $x[k,l] \in \mathbb{C}^{N_T \times 1}$ corresponds to an effective transmitted data symbol column vector having a respective complex symbol $x_j[k,l] \in \mathbb{C}$ corresponding to j-th transmit antenna. $H_{i,j}[k,l] \in \mathbb{C}$ corresponds to a Channel Frequency Response (CFR) of an (i, j)-th Rx-Tx path. $n_i[k,l]$ corresponds to a complex circular white Gaussian noise with zero mean and variance $\sigma_{n_i}^2$.

Figure 4:
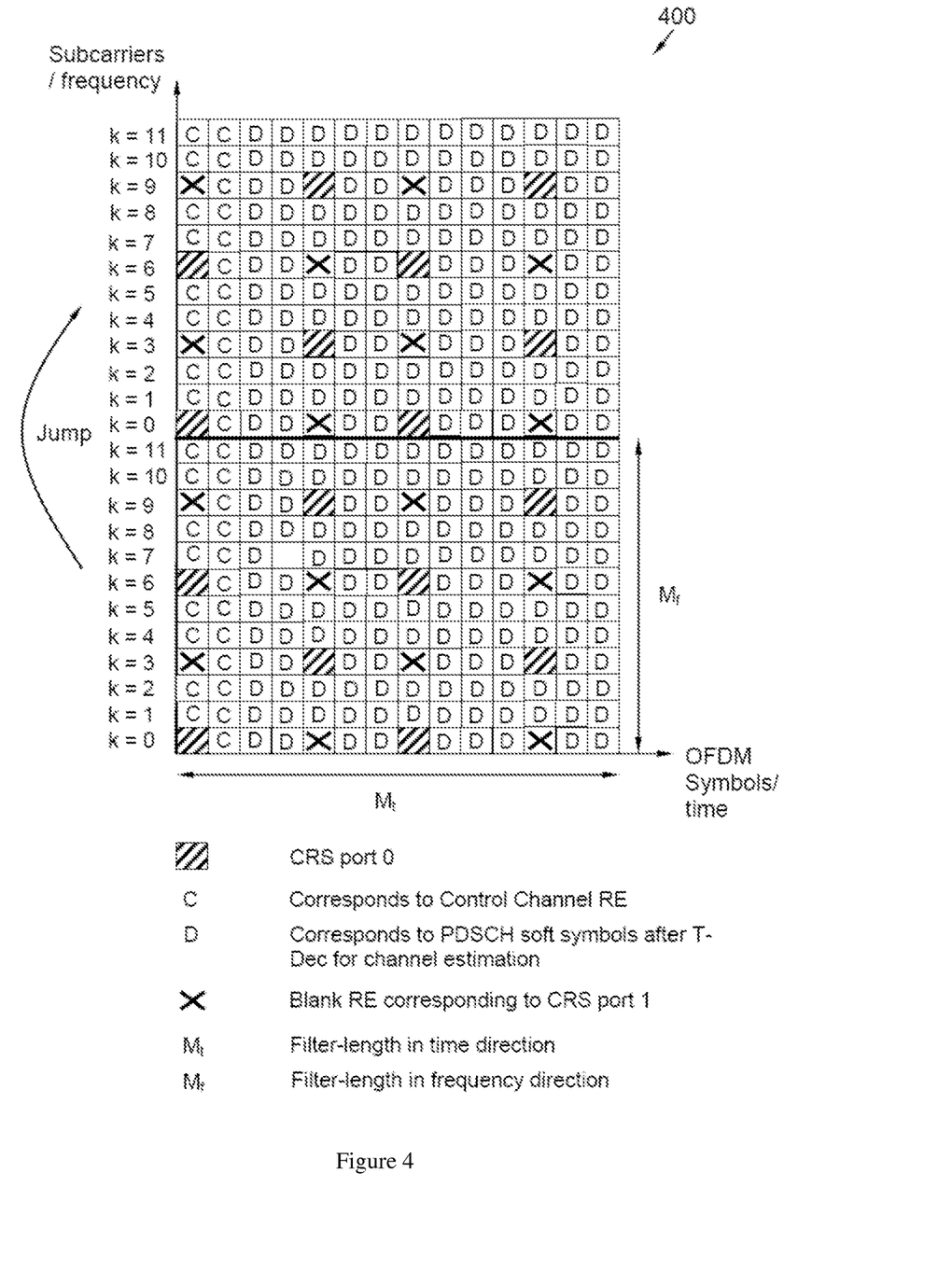
FIG. 4 is a block diagram illustrating channel re-estimation via 2D jumping window, according to an embodiment of the invention.

The initial CRS-CE may be performed utilising via either 2×1D Wiener filtering or 2D Wiener filtering without the utilisation of soft-data according to some embodiments. FIG. 4 illustrates channel (re-) estimation within soft-ICE framework by employing a so-called jumping-window based 2D Wiener filter-bank for a window size of 1 PRB-pair considering normal cyclic prefix (CP). Within a jumping-window, all the channel estimates are available in one-shot estimation. On the other hand, sliding-window (e.g., with a granularity of one PRB-pair size) may also be employed which may render better performance with increased complexity. However, considering the complexity and performance trade-off, 2D jumping-window may have certain advantages for soft-ICE than 2D sliding-window.

For soft-ICE filtering, all the soft data symbols and pilots are available at every allocated REs, the channel autocorrelation may be computed for one subcarrier spaced (assuming full resource allocation). The Wiener filter (or window) length in the frequency-direction is denoted as $M_f$ while in the time-direction is denoted as $M_t$. In general, the window-size in the frequency direction may be the full FFT size and in the time direction may be of subframe length (e.g. 14 OFDM symbols for normal CP). However, from implementation perspective, the larger window size would mean higher complexity cost; so a reasonable choice of the window would be preferable.

In order to perform soft-ICE filtering by employing 2D jumping-window, the received signal per RE given in Equation 1 may be vectorized within the considered window size, as depicted in FIG. 4 in order to re-estimate CFRs, over all the REs within a jumping-window, for an (i, j)-th Rx-Tx path as given in Equation 2. It may be noticed that the received symbols are vectorized column-wise, i.e., stacking the received symbols per OFDM symbol within a filtering window on top of each other.

$$\underbrace{r_i}_{(M_f M_t) \times 1} = \sum_{j=1}^{N_T} \underbrace{\text{diag}(\{x_j[k,l]\})}_{=X_j \atop (M_f M_t) \times (M_f M_t)} \underbrace{vec(H_{i,j})}_{(M_f M_t) \times 1} + \underbrace{vec(n_i)}_{(M_f M_t) \times 1} \quad \text{Eqn. 2}$$

$$= \sum_{j=1}^{N_T} X_j \underbrace{vec(H_{i,j})}_{=H_{i,j}} + \underbrace{vec(n_i)}_{=n_i}$$

$$= \sum_{j=1}^{N_T} X_j H_{i,j} + n_i$$

A low-rank SAGE-MAP based shift/time-variant soft-ICE pseudo-algorithm is given below considering 2D jumping window (m corresponds to an approximated rank of a channel autocorrelation matrix).

For i = 1:$N_R$ $$\varepsilon_i = \underbrace{r_i}_{= \sum_{j=1}^{N_T} X_j H_{i,j} + n_i} - \underbrace{\hat{z}_i}_{= \sum_{j=1}^{N_T} \hat{x}_j \hat{H}_{i,j}^{(0)}} \quad \text{Eqn. 3}$$

For g = 0: G−1
    For j = 1:$N_T$, $$\hat{y}_{i,j} = \hat{X}_j \hat{H}_{i,j}{}^{(g)} + \epsilon_i \qquad \text{Eqn. 4}$$

$$\hat{H}_{i,j}^{(g+1)} \begin{cases} = \left(R_{hh}^{-1} + \hat{X}_j^H \Sigma_{\epsilon_i}^{-1} \hat{X}_j\right)^{-1} \hat{X}_j^H \Sigma_{\epsilon_i}^{-1} \hat{y}_{i,j} & \text{Eqn. 5} \\ = U\left(\Lambda^{-1} + U^H \hat{X}_j^H \Sigma_{\epsilon_i}^{-1} \hat{X}_j U\right)^{-1} U^H \hat{X}_j^H \Sigma_{\epsilon_i}^{-1} \hat{y}_{i,j} & \begin{cases} \because \\ R_{hh} = U\Lambda U^H \\ \approx U_m \Lambda_M U_m^H \end{cases} & \text{Eqn. 6} \\ \approx U_m\left(\Lambda_m^{-1} + U_m^H \hat{X}_j^H \Sigma_{\epsilon_i}^{-1} \hat{X}_j U_m\right)^{-1} U_m^H \hat{X}_j^H \Sigma_{\epsilon_i}^{-1} \hat{y}_{i,j} & \text{Eqn. 7} \end{cases}$$

$$\epsilon_i = \epsilon_i + \hat{X}_j(\hat{H}_{i,j}{}^{(g)} - \hat{H}_{i,j}{}^{(g+1)}) \qquad \text{Eqn. 8}$$

end
end
end where $R_{hh} \in C^{(M_fM_t) \times (M_fM_t)}$ corresponds to channel autocorrelation and may be expressed in terms of Kronecker product of channel autocorrelations in frequency ($R_f$) and time direction ($R_t$) as $R_{hh} = R_t \otimes R_f$.

The $R_{hh}$ may be decomposed via an Singular Value Decomposition (SVD) and may be approximated with the dominant singular values m, i.e.:

$$R_{hh} = U\Lambda U^H$$
$$\approx U_m \Lambda_m U_m^H.$$

where $U_m$ corresponds to the first m columns of unitary matrix U and $\Lambda_m$ corresponds to the first m diagonal elements of a diagonal matrix $\Lambda$. The dominant singular values or rank m may be dependent on the size of the jumping window and CPE according to some embodiments. $\Sigma_{\epsilon_i} \in R^{(M_fM_t) \times (M_fM_t)}$ is a diagonal matrix comprising effective noise variance input to the soft-ICE, $$\sum_{\epsilon_i} = \text{diag}(\{\sigma_{\epsilon_i}^2[k, l]\})$$

where $$\sigma_{\epsilon_i}^2[k, l] = E\{\epsilon_i[k, l]\epsilon_i^H[k, l]\}$$

$$= E\left\{\sum_{j=1}^{N_T} ((x_j[k, l] - \hat{x}_j[k, l])H_{i,j}[k, l] + n_i[k, l]) \\ ((x_j[k, l] - \hat{x}_j[k, l])H_{i,j}[k, l] + n_i[k, l])^H\right\}$$

$$\approx \sigma_h^2 \sum_{j=1}^{N_T} \sigma_{\hat{x}_j}^2[k, l] + \sigma_{n_i}^2[k, l]$$

Notice the approximation is based on the assumption that the effective soft symbol error $(x_j[k,l] - \hat{x}_j[k,l])$ is uncorrelated to the noise $n_i[k,l]$. Moreover, the CFRs are assumed to be spatially uncorrelated. $\hat{x}_j \in C^{(M_fM_t) \times (M_fM_t)}$ is a diagonal matrix comprising effective soft symbols ($\hat{x}_j[k,l]$) or pilots/CRSs corresponding to j-th transmit antenna, within the filtering window. The soft symbols and corresponding variance may then be computed.

As mentioned previously, the cognitive scheduler may utilise one, or both, of two key inputs in order to select a suitable soft MIMO detector and enable/disable soft-ICE over JoICED iterations according to the channel state. The two key inputs to the described scheduler may comprise either LQM-S or CPE.

According to some embodiments, the scheduler may re-use LQM-S, e.g. MIESM/MMIBM of the CQI estimator in the receiver 120. Further, the CPE may be obtained. Based on the above two key input information in addition to the MCS and transmission scheme obtained from the control channel, the scheduler may choose an appropriate (soft) MIMO detector from a set of candidate detectors depending on the predicted BLER region (mapped via an LQM-S) and CPE. Moreover, the scheduler also may output whether the soft-ICE should be enabled or disabled accordingly. In other words, some embodiments of the scheduler operation may be posed as a following constraint optimisation problem:

$$\max_{Det-type \in \{soft-MIMO-detector-type\}} \text{Throughput}$$

$$(LQM - S(TxS, MCS, Det\text{-type}), CPE)$$

such that $BLER_{predicted}(LQM - S(TxS, MCS, Det\text{-type}), CPE) < \text{Threshold}$ where TxS and MCS correspond to the considered transmission scheme and MCS index, respectively.

Furthermore, the by-product of the above optimisation problem fulfilling the constraint may also determine whether the soft-ICE will be enabled over iterations according to some embodiments.

Although this aforementioned optimisation problem might look simple, unfortunately, it is not easy to solve analytically for LTE-like wireless communication systems 100. So, for the limited JoICED iterations budget in a real chipset design, a pre-determined set of scheduling may be obtained via simulations, according to some embodiments. Hence, based on the above mentioned two key input information, i.e., LQM-S and CPE, the scheduler may search for a suitable scheduling steps from the set. The following example illustrates the concept of the dictionary-aided cognitive scheduler for the real system.

An example of the cognitive scheduling, under ETU300 high spatial correlation channel conditions for the spatial multiplexing transmission scheme and 16 quadrature amplitude modulation (QAM) alphabet according to some embodiments, is as following.

The scheduler determines the channel conditions, such as e.g. BLER, by making a prediction via LQM-S. When the predicted BLER is less than some pre-determined threshold which may be obtained via a mapping of LQM-S, the scheduler may choose an ML/MAP-type receiver for data detection at least in the first iteration since they are known to outperform LMMSE receiver when spatial correlation is high and operating in the mid/high SNR regime.

Since ETU300 is a doubly selective channel, scheduler may activate soft-ICE in the following JoICED iterations according to the chosen scheduling set.

However, if the predicted BLER is more than some pre-determined threshold (i.e., when operating in low-SNR regime), then the scheduler may choose rather a LMMSE-type receiver since ML/MAP-type receivers underperform compared to the LMMSE-type receivers in low-SNR regime.

Further, as it is well known that the soft-ICE does not perform well in low-SNR regime, then the soft-ICE may be turned off, in order to save power and latency according to some embodiments.

A pre-AHBC may be applied according to some embodiments, in order to combat the detrimental effects of generic/non-adaptive JoICED to HARQ buffer; particularly when soft-ICE is enabled and the low quality soft feedback data is utilised. In other words, the functionalities of pre-AHBC are to avoid, or at least minimise the error propagation over JoICED iterations, due to low quality soft feedback data, and to further minimise the BER/BLER over JoICED iterations by utilising any of the LQM-Hs given below, according to some embodiments.

The following two LQM-Hs may be utilised for pre-AHBC according to some embodiments.

The first novel heuristic LQM-H is computing effective Mutual Information (MI) utilising the first two moments of the LLRs whose accuracy is further enhanced by incorporating the dynamics of the MI, either by utilising reliability of the LLRs or the so-called symbol information in different embodiments.

$$\underbrace{MI_{\mathit{eff}}^{\mathit{symbol}}(JoICEDitr\#, CW\#c, MCS, \text{soft-}MIMO\text{-}Det\text{-type})}_{LQM-H}$$

$$= \begin{cases} \dfrac{\alpha_1}{N_{Symb}N_{data}} \underbrace{\sum_{l=1}^{N_{Symb}} \sum_{k=1}^{N_{data}} SI(AVE[k,l], VAR[k,l])}_{\propto MI^{symbol}} + \\ \underbrace{\lambda_1 \text{var}_{k,l} \left\{ \dfrac{1}{\log_2 M} \sum_{m=1}^{\log_2 M} \underbrace{f_l(|LLRs(m)|)}_{=MI^{coded-bit}} \right\}}_{\text{correction term}} \\ \underbrace{\Leftrightarrow MI^{symbol}}_{} \\ = \dfrac{\alpha_2}{N_{Symb}N_{data}} \sum_{l=1}^{N_{Symb}} \sum_{k=1}^{N_{data}} SI(AVE[k,l], VAR[k,l]) + \\ \underbrace{\lambda_2 \text{var}_{k,l}\{SI(AVE[k,l], VAR[k,l])\}}_{\text{correction term}} \end{cases}$$

where $MI_{\mathit{eff}}^{\mathit{symbol}}$ corresponds to an effective scalar dependent on the JoICED iteration number (JoICEDitr#), codeword/transport-block (CW#c), MCS index (MCS) and soft-MIMO detector type soft-MIMO-Det-type). SI(AVE[k,l], VAR[k,l]) is a Symbol Information (SI) per symbol or resource element, proportional to an MI per symbol; dependent on the parameters namely {AVE[k,l], VAR[k,l]}.

Unfortunately, the SI metric may not be accurate enough, in particular when there is some error propagation by JoICED components, namely soft-ICE and/or soft MIMO detectors.

Some embodiments may enhance the accuracy estimation by incorporating a so-called correction term, i.e., the dynamics (or equivalently variance) of the MI/SI per symbol. It may be noticed that the correction term may be computed by utilising either MI directly from the reliability of the LLRs, or simply the variance of the computed SI per symbol. The latter technique may be preferred in some embodiments. $\lambda_i$ is a correction factor dependent on the MCS and soft-MIMO detector type which is obtained via simulations. $\alpha_i$ is a normalisation factor depending on MCS which is obtained via simulations. $N_{symb}$ represents the number of OFDM symbols utilised for the LQM-H computation. $N_{data}$ denotes the number of data subcarriers utilised for the LQM-H computation. M corresponds to a number of constellation points within a considered modulation alphabet.

It may be mentioned that these novel MI based metrics may also be utilised for CQI estimation (or link adaptation) purpose.

The second novel LQM-H may be an enhanced robust version than utilised in prior art by introducing regularisation, e.g., L1, L2 norms, as a correction term and relatively less complex than the first LQM-H metric based on effective MI, according to some embodiments.

$$\underbrace{R\text{-}norm(JoICEDitr\#, CW\#c, MCS) = \|r - \hat{X}\hat{H}\|_2^2 + \beta\|\hat{H}\|_p^p}_{LQM-H}$$

where R-norm denotes a regularized norm metric dependent on the JoICED iteration number (JoICEDitr#), codeword/transport-block (CW#c) and MCS index (MCS). r is a received (post-FFT) signal vector. $\hat{X}$ is a diagonal matrix comprising the estimated data symbols for the considered JoICED iteration. $\hat{H}$ is a vector of channel estimates corresponding to either CRS-CE or softCE depending on whether the soft-ICE is disabled or enabled for the considered JoICED iteration. $\beta$ corresponds to a correction factor dependent on the MCS index which is obtained via simulations. p represents either norm-1 or norm-2, i.e., p=1 or p=2, respectively according to some embodiments.

It may be noticed that this regularised norm metric may easily be employed for LMMSE-type detectors while for ML/MAP-type receivers the soft bits may require to be converted to appropriate hard symbols, according to some embodiments.

The functionality of the pre-AHBC may be re-iterated in other words. If the Cyclic Redundancy Check (CRC) of either codewords has failed, the pre-AHBC updates the HARQ buffer with a suitable set of LLRs output from the MIMO detector/demodulator ($L_{D1}$) at the appropriate JoICED iteration which maximises or minimises the aforementioned LQM-H over the iterations accordingly. So, some embodiments of the pre-AHBC may mathematically be represented as follows for the above two LQM-Hs, respectively:

$$L_{D1}(JoICEDitr^*_{CW\#c,MCS}) = \underset{\{JoICEDitr\#\}}{\arg\max} \; MI_{\mathit{eff}}^{\mathit{symbol}}(JoICEDitr\#, CW\#c, MCS)$$

or $$L_{D1}(JoICEDitr^*_{CW\#c,MCS}) = \underset{\{JoICEDitr\#\}}{\arg\min} \; R\text{-}norm(JoICEDitr\#, CW\#c, MCS).$$

Some embodiments of the adaptive JoICED may significantly outperform a generic/non-adaptive JoICED as corroborated via the simulations. The key simulation parameters for LTE PDSCH demodulation are given in Table 1 for the considered test scenario.

TABLE 1

| | |
|---|---|
| Cell Bandwidth | 10 MHz |
| Transmit EVM | 6% |

TABLE 1-continued

| | |
|---|---|
| MIMO Configuration ($N_R \times N_T$) | 2 × 2 |
| PDSCH Resource Allocation | 50 PRB-pair |
| Transmission Mode | 3 (Open-Loop Spatial Multiplexing—OLSM Rank-2) with no fallback mode to transmission mode 2 (SFBC). |
| Modulation and Code Rate | 16 QAM ½ |
| Channel Model | ETU 300 MED |
| Maximum JoICED iterations | 3 (including the first decoding attempt) for the iterative receivers. |
| Fixed Turbo Decoder iterations per JoICED iteration | [8 8 8] |
| Supported MIMO Demodulator candidates | LMMSE (non-iterative) LMMSE-based SPIC Detector QRDM (ML-type receiver) (with max-log-MAP soft-bits generation) |
| Soft-ICE details | Low-rank SAGE-MAP (rank = 12) with 5 PRB-pair 2D jumping-window |
| CRS-CE details | 2x1D LMMSE (Wiener) with time-first Wiener filtering. |
| LQM-H metric | MI based |
| ICI Cancellation | Not Enabled |
| HARQ | Enabled |
| Number of Subframes | 1000 |

Figure 5:
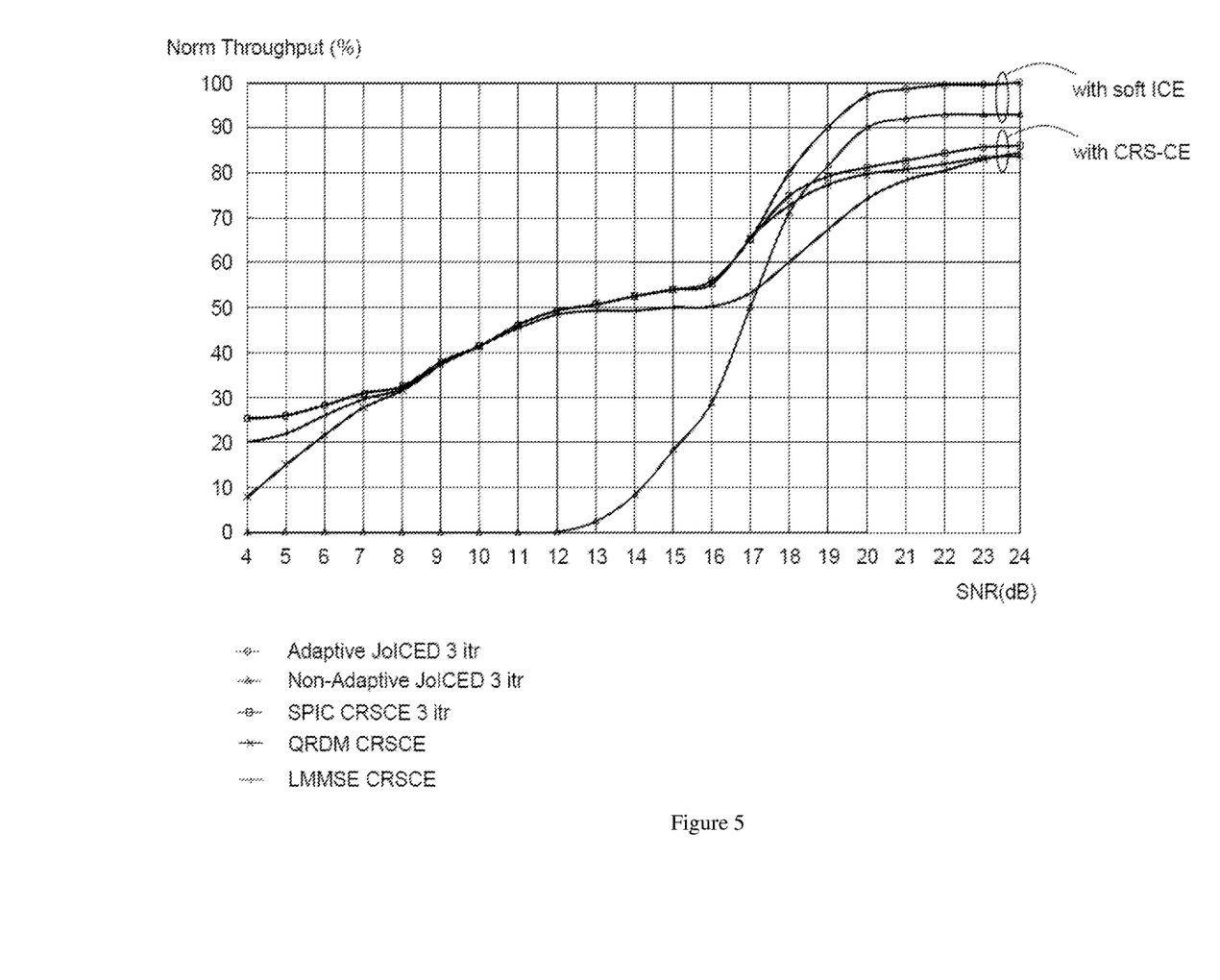
FIG. 5 is a diagram illustrating normalised throughput and noise ratio according to different approaches.

FIG. 5 shows the performance of an embodiment of the low-complexity adaptive JoICED under doubly selective channel conditions (ETU300 medium correlation) for 16QAM modulation alphabet, according to the invented method. As corroborated via these numerical results, as expected, some embodiments of the adaptive JoICED outperform the non-adaptive/generic JoICED and other CRS-aided demodulation scenarios in highly time and frequency selective channel conditions. The CRS-aided reference curves correspond to the demodulation with the various fixed detectors, namely LMMSE with Soft Parallel Interference Cancellation (SPIC), which may utilise CRS-aided channel estimation only in some embodiments. Moreover, for the non-adaptive JoICED, LMMSE with SPIC and soft-ICE are enabled over all the JoICED iterations.

The cognitive scheduler for adaptive JoICED according to some embodiments may schedule the detector and channel estimator over the JoICED iterations as following: at the first iteration, QRDM detector type utilising CRS-CE, second iteration LMMSE with SPIC utilising CRS-CE while at the last iteration LMMSE with soft-ICE. The reason for the choice of QRDM detector at least in the first iteration is due to the spatially correlated channel type, since the ML-type receivers may render better performance for spatially correlated receivers compared to LMMSE type detectors. In the following JoICED iterations, the scheduler may choose, according to some embodiments, mainly SPIC rather than the QRDM detector since most of the gains of ML-type receiver have been harnessed in the first attempt of decoding by utilising QRDM detector. Further, considering the performance gains and energy consumption trade-off in the following iterations, SPIC seems to be a better candidate for the considered scenario. In the last iteration, adaptive JoICED enables soft-ICE in conjunction with the non-iterative LMMSE detector only rather than LMMSE with SPIC since this combination of scheduling in the last iteration seems to break the loopy nature in the belief propagation sense, or any error propagation caused by SPIC, and thereby remove/reduce the error floor significantly.

Figure 6:
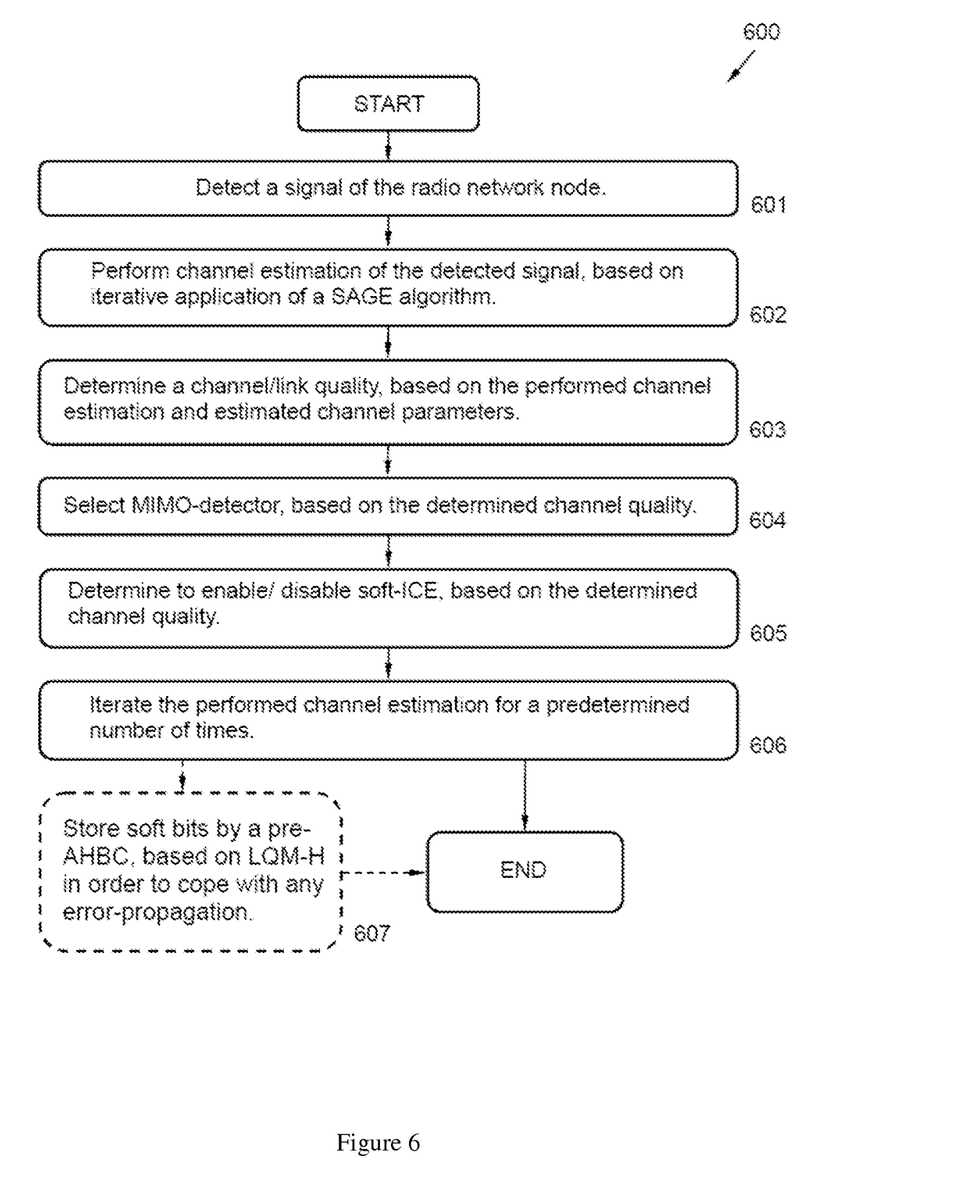
FIG. 6 is a flow chart illustrating a method in a receiver according to an embodiment of the invention.

FIG. 6 is a flow chart illustrating embodiments of a method 600 in a receiver 120 for iterative channel estimation and data decoding of signals received from a radio network node 110, located in a wireless communication network 100. The wireless communication network 100 may be based on 3GPP LTE. The receiver 120 may be a UE. The radio network node 110 may comprise an evolved NodeB (eNodeB) according to some embodiments.

The receiver 110 may receive signals transmitted by the radio network node 120 over a data channel, which may comprise a Physical Downlink Shared Channel (PDSCH). The corresponding control channel may comprise an Enhanced Physical Downlink Control Channel (EPDCCH) according to some embodiments.

To appropriately perform the transmission, the method 600 may comprise a number of actions 601-607.

It is however to be noted that any, some or all of the described actions 601-607, may be performed in a somewhat different chronological order than the enumeration indicates, or even be performed simultaneously. Further, it is to be noted that some actions such as action 607 are optional and only performed according to some embodiments. The method 600 may comprise the following actions:

Action 601

A signal of the radio network node 110 is detected.

Action 602

Channel estimation of the detected 601 signal, based on iterative application of a SAGE algorithm is performed.

Further, according to some embodiments, the channel estimation may be performed with a MAP criterion.

The channel estimation may be performed by window-aided, such as 2D jumping window, low-rank soft-ICE filtering based on SAGE-MAP framework, according to some embodiments.

Action 603

A channel/link quality is determined, based on the performed 602 channel estimation and the estimated channel parameters.

The determined channel/link quality may comprise, e.g., LQM-S, LQM-H and/or CPE according to some embodiments.

Action 604

A MIMO detector is selected, based on the determined 603 channel/link quality.

The MIMO detector may be selected from a group comprising: non-iterative LMMSE; SPIC; and/or soft QRD-M, according to some embodiments.

Action 605 soft-ICE is enabled and/or disabled, respectively, based on the determined 603 channel/link quality.

The soft-ICE may be enabled and/or disabled based on LQM-S and/or CPE, according to some embodiments.

Action 606

The performed 602 channel estimation is iterated for a predetermined number of times.

The number of times the channel estimation is iterated may be e.g. 1, 2, . . . , n times where n is an arbitrary integer. In some embodiments, the channel estimation may be iterated e.g. three times.

Action 607

This action may be performed according to some optional embodiments.

Soft bits may be stored by a pre-AHBC based on LQM-H in order to cope with any error-propagation.

Figure 7:
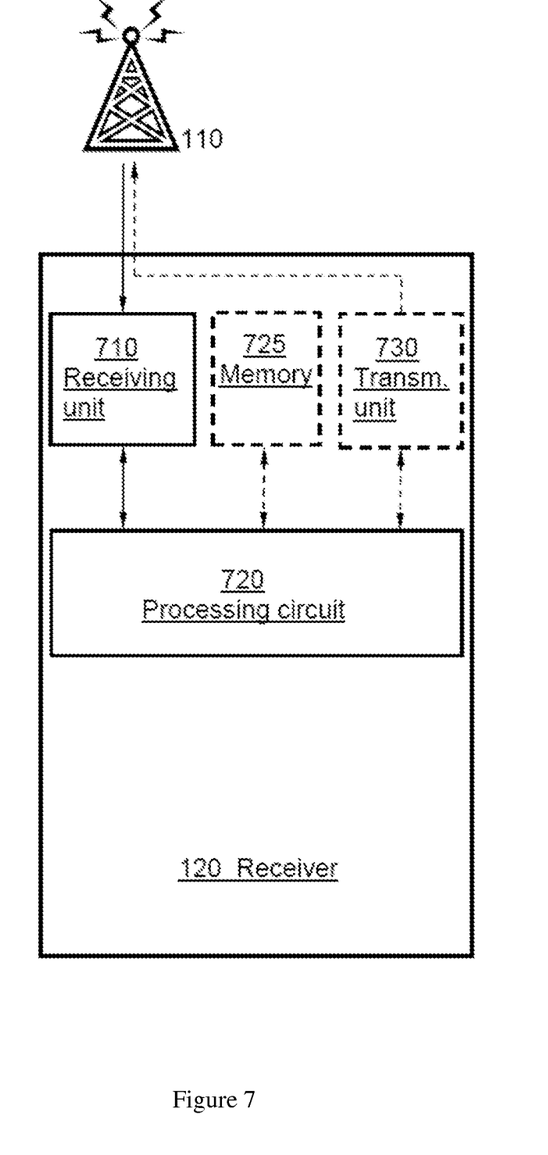
FIG. 7 is a block diagram illustrating a receiver according to an embodiment of the invention.

FIG. 7 is a block diagram illustrating a receiver 120 in a wireless communication network 100. The receiver 120 is configured for receiving wireless signals from a radio network node 110 within the wireless communication network 100. Further, the receiver 120 is configured for performing the above mentioned method 600 according to any, some or all of the actions 601-607 for iterative channel estimation and data decoding of signals received from a radio network node 110, located in a wireless communication network 100.

The wireless communication network 100 may be based on 3GPP LTE. The receiver 120 may be a UE. The radio network node 110 may comprise an eNodeB according to some embodiments.

The receiver 110 may receive signals transmitted by the radio network node 120 over a data channel, which may comprise a PDSCH. The corresponding control channel may comprise an EPDCCH according to some embodiments.

For enhanced clarity, any internal electronics or other components of the receiver 120, not completely indispensable for understanding the herein described embodiments have been omitted from FIG. 7.

The receiver 120 comprises a receiving circuit 710, configured for receiving signals from the radio network node 110.

Further, the receiver 120 comprises a processing circuit 720, configured for detecting signals of the radio network node 110. The processing circuit 720 may further be configured for performing channel estimation of the detected signal, based on iterative application of a SAGE algorithm. Furthermore, the processing circuit 720 may also be configured for determining a channel/link quality, based on the performed channel estimation. Additionally, the processing circuit 720 may also be configured for selecting MIMO detector based on the determined channel/link quality. In addition, the processing circuit 720 may also be configured for determining to enable and/or disable, respectively, soft-ICE, based on the determined channel/link quality. In further addition, the processing circuit 720 may be configured for iterating the performed channel estimation for a predetermined number of times.

According to some embodiments, the processing circuit 720 may be further configured for performing channel estimation with a MAP criterion.

The processing circuit 720 may be further configured for performing channel estimation by window-aided, such as 2D jumping window, low-rank soft-ICE filtering based on SAGE-MAP framework, according to some embodiments.

The processing circuit 720 may be further configured for enabling/disabling soft-ICE, further based on LQM-S and/or CPE according to some embodiments.

The processing circuit 720 may be further configured for storing soft bits by a pre-AHBC, based on LQM-H in order to cope with any error propagation.

Furthermore, according to some embodiments, the processing circuit 720 may be further configured for selecting the MIMO detector from a group comprising: non-iterative LMMSE, SPIC, and/or QRD-M.

The processing circuit 720 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The herein utilised expression "processing circuit" may thus represent a processing circuitry comprising a plurality of processing circuits, such as, e.g., any, some or all of the ones enumerated above.

The processing circuit 720 may further perform data processing functions for inputting, outputting, and processing of data comprising data buffering and device control functions, such as call processing control, user interface control, or the like.

Furthermore, the receiver 120 may comprise at least one memory 725, according to some embodiments. The memory 725 may comprise a physical device utilised to store data or programs, i.e., sequences of instructions, on a temporary or permanent basis. According to some embodiments, the memory 725 may comprise integrated circuits comprising silicon-based transistors. Further, the memory 725 may be volatile or non-volatile.

Further, the receiver 120 may also comprise a transmitting unit 730, configured for transmitting information in the uplink, to be received by the serving radio network node 110 according to some embodiments.

The actions 601-607 to be performed in the receiver 120 may be implemented through the one or more processing circuits 720 in the receiver 120, together with computer program code for performing the functions of the actions 601-607. Thus a computer program product, comprising instructions for performing the actions 601-607 in the receiver 120 may perform the method 600 for iterative channel estimation and data decoding of signals received from a radio network node 110, located in a wireless communication network 100 when the computer program product is loaded in a processing circuit 720 of the receiver 120.

The computer program product mentioned above may be provided for instance in the form of a data carrier carrying computer program code for performing any, at least some, or all of the actions 601-607 according to some embodiments when being loaded into the processing circuit 720. The data carrier may be, e.g., a hard disk, a compact disc (CD) read-only memory (ROM) disc, a memory stick, an optical storage device, a magnetic storage device or any other appropriate medium such as a disk or tape that may hold machine readable data in a non transitory manner. The computer program product may furthermore be provided as computer program code on a server and downloaded to the receiver 120 remotely, e.g., over an Internet or an intranet connection.

The terminology used in the detailed description of the invention as illustrated in the accompanying drawings is not intended to be limiting of the described method 600, radio network node 110 and/or receiver 120, which instead are limited by the enclosed claims.

As used herein, the term "and/or" comprises any and all combinations of one or more of the associated listed items. In addition, the singular forms "a", "an" and "the" are to be interpreted as "at least one", thus also comprising a plurality, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof.

What is claimed is:

1. A method for iterative channel estimation and data decoding of signals received from a radio network node, performed in a receiver located in a wireless communication network, the method comprising:
  detecting a signal of the radio network node;
  performing channel estimation of the detected signal based on iterative application of a Space Alternating Generalised Expectation and maximisation (SAGE) algorithm;
  determining a channel or link quality based on the performed channel estimation and the estimated channel parameters;

selecting a Multiple-Input and Multiple-Output (MIMO) detector based on the determined channel or link quality;

determining to enable or disable soft-Iterative Channel Estimation (soft-ICE) based on the determined channel or link quality;

iterating the performed channel estimation for a predetermined number of times; and storing soft bits by a pre-Turbo Decoder (pre-TDEC) Adaptive Hybrid Automatic Repeat Request (HARQ) Buffer Controller (pre-AHBC) based on Link Quality Metric for HARQ (LQM-H) buffer controlling purpose.

2. The method according to claim 1 further comprising performing the channel estimation with a Maximum A Posteriori (MAP) criterion.

3. The method according to claim 1, wherein the action of performing channel estimation further comprises window-aided low-rank soft-ICE filtering based on SAGE-MAP framework.

4. The method according to claim 1, wherein the action of enabling or disabling soft-ICE is further based on Link Quality Metric for Scheduling (LQM-S).

5. The method according to claim 1, wherein the action of enabling or disabling soft-ICE is further based on Channel Parameter Estimates (CPE).

6. The method according to claim 1, wherein the MIMO detector is non-iterative Linear Minimum Mean Square Error (LMMSE).

7. The method according to claim 1, wherein the MIMO detector is Soft LMMSE based Parallel Interference Cancellation (SPIC).

8. The method according to claim 1, wherein the MIMO detector is soft QR Decomposition based M-algorithm (QRD-M).

9. A receiver configured for iterative channel estimation and data decoding of signals received from a radio network node, wherein the receiver is located in a wireless communication network, the receiver comprising:

a receiving circuit configured to receive signals from the radio network node; and a processing circuit configured to:
detect signals of the radio network node;
perform channel estimation of the detected signal based on iterative application of a Space Alternating Generalised Expectation and maximisation (SAGE) algorithm;
determine a channel or link quality based on the performed channel estimation;
select a Multiple-Input and Multiple-Output (MIMO) detector from a group consisting of non-iterative Linear Minimum Mean Square Error (LMMSE), Soft LMMSE based Parallel Interference Cancellation (SPIC), and soft QR Decomposition based M-algorithm (QRD-M);
determine to enable or disable soft-Iterative Channel Estimation (soft-ICE) based on the determined channel or link quality; and
iterate the performed channel estimation for a predetermined number of times.

10. The receiver according to claim 9, wherein the processing circuit is further configured to perform channel estimation with a Maximum A Posteriori (MAP) criterion.

11. The receiver according to claim 9, wherein the processing circuit is further configured to perform channel estimation by window-aided low-rank soft-ICE filtering based on SAGE-MAP framework.

12. The receiver according to claim 9, wherein the processing circuit is further configured to enable or disable soft-ICE based on Link Quality Metric for Scheduling (LQM-S).

13. The receiver according to claim 9, wherein the processing circuit is further configured to enable or disable soft-ICE based on Channel Parameter Estimates (CPE).

14. The receiver according to claim 9, wherein the processing circuit is further configured to store soft bits by a pre-Turbo Decoder (pre-TDEC) Adaptive Hybrid Automatic Repeat Request (HARQ) Buffer Controller (pre-AHBC) based on Link Quality Metric for HARQ (LQM-H) buffer controlling purpose.

15. A non-transitory computer readable medium having computer executable instructions thereon, wherein the computer executable instructions, when executed by a computer, performs a method comprising:

detecting a signal of a radio network node;
performing channel estimation of the detected signal based on iterative application of a Space Alternating Generalised Expectation and maximisation (SAGE) algorithm;
determining a channel or link quality based on the performed channel estimation and the estimated channel parameters;
selecting a Multiple-Input and Multiple-Output (MIMO) detector from a group consisting of non-iterative Linear Minimum Mean Square Error (LMMSE), Soft LMMSE based Parallel Interference Cancellation (SPIC), and soft QR Decomposition based M-algorithm (QRD-M);
determining to enable or disable soft-Iterative Channel Estimation (soft-ICE) based on the determined channel or link quality; and
iterating the performed channel estimation for a predetermined number of times.

16. A processor comprising a processing circuit configured to:

detect signals of the radio network node;
perform channel estimation of the detected signal based on iterative application of a Space Alternating Generalised Expectation and maximisation (SAGE) algorithm;
determine a channel or link quality based on the performed channel estimation;
select a Multiple-Input and Multiple-Output (MIMO) detector from a group consisting of non-iterative Linear Minimum Mean Square Error (LMMSE), Soft LMMSE based Parallel Interference Cancellation (SPIC), and soft QR Decomposition based M-algorithm (QRD-M);
determine to enable or disable soft-Iterative Channel Estimation (soft-ICE) based on the determined channel or link quality; and
iterate the performed channel estimation for a predetermined number of times.

\* \* \* \* \*